UNITED STATES PATENT OFFICE.

SADAKICHI SATOW, OF SENDAI, JAPAN.

LACQUERED PRODUCT AND PROCESS OF MAKING SAME.

1,245,982.   Specification of Letters Patent.   Patented Nov. 6, 1917.

No Drawing.   Application filed February 1, 1917.   Serial No. 145,980.

*To all whom it may concern:*

Be it known that I, SADAKICHI SATOW, a subject of the Emperor of Japan, residing at Sendai, Japan, have made a certain new and useful Invention in Lacquered Products and Processes of Making the Same, of which the following is a specification.

This invention relates to lacquered products such as tile, glass, brick boards and the like, and process of making the same.

The object of the invention is to utilize vegetable proteids in the manufacture of lacquered products of the nature referred to for use wherever such products are required. Other objects of the invention will appear more fully hereinafter.

In carrying out my invention I employ vegetable proteids or proteidal substances such as are obtained from suitable vegetable proteid containing material.

The proteids or proteidal substances employed in carrying out my invention are obtained in any suitable manner from any suitable raw material which contains vegetable proteids, such as beans, peas, wheat, corn or other leguminous, cereal or grain products.

The proteid containing raw material is crushed to break down the cellular structure thereof, and, if the material employed contains an undesirable percentage of oil, the oil content is removed. This may be effected in any suitable manner, as, for example, by treating the mass with an oil solvent such as benzin. The oil solvent is then removed from the mass.

The proteidal substances contained in the "meal" or "proteid meal," thus produced, are separated therefrom to produce a refined proteid product. This separation of the proteidal substances from the proteid meal may be effected in various ways. According to one method the "meal" is treated with an alkaline solution, such as a dilute solution of caustic or carbonated alkali, or caustic or carbonated ammonia, and the proteidal substances, either with or without further purification of the resulting liquid, are precipitated therefrom. The further purification referred to may be accomplished by filtration, centrifuging or the like, by fractional precipitation, fractional solution of precipitated impure proteids, or by converting one or more components into other chemical compounds having different properties which enable their separation, or one or more of these various purifying methods may be employed in combination with the others. The precipitation of the refined proteidal substances is accomplished by adding a suitable acid such as sulfuric, sulfurous, acetic or phosphoric, or by adding a suitable ferment such as lactic or acetic.

According to another method the "meal" is treated with water and the refined proteidal products are precipitated out of the resulting liquid, either with or without purification thereof, as above explained, the precipitation being effected with an acid or a ferment as above described.

According to still another method the "meal" is treated with an aqueous salt solution, such as sodium chlorid, ammonium sulfate, or the like, and the resulting liquid, either with or without further purification, as explained, is subjected to dialysis.

The refined proteids or proteidal substances, obtained as above described, whether in the form of a dry powder, or of a moistened mass or cake, are subjected to the action of a suitable glutinizing agent. I have found that aromatic compounds which possess acid properties, such as carbolic acid, cresol or other phenol will well answer the purpose.

When vegetable proteids of the character which are soluble in a phenol, are mixed with such a glutinizing agent, by reason of the amphoteric property of the proteid, the phenol combines with the proteids which pass into solution, and forms a complex salt. When such combination takes place at the proper temperature sudden chemical changes occur in the mass and a liquid glue-like substance of transparent light brown color, and possessing great adhesiveness, will be obtained. Care should be taken to effect the combination at the proper temperature because if the temperature is not at the right degree the result is a substance which possesses very little adhesive property. Particularly is this true of glycinin. The chemical changes effected when the proper temperature is observed are especially remarkable when the glycinin contains a suitable proportion of water.

The glutinized mass obtained as above described is then treated with a suitable condensing agent, such as an active methylene compound. I have found that formaldehyde well answers the purpose, although trioxy-methylene, hexa-methylene tetramin, and the like, may be employed. The condensing agent is mixed with the glutinized mass. A remarkable chemical change takes place the instant the condensing agent is added to the mass. The liquid adhesive glue-like substance is transformed into a jelly-like mass. After a few seconds, however, with the kneading stirring or mixing operation continuing, the mass resumes its liquid form, and its adhesive property, which was reduced by the sudden chemical action referred to, is restored. Ordinarily when a phenol is combined with formaldehyde or other active methylene compound, in the presence of a catalyzer, such as ammonia, caustic soda, or sulfuric acid, water results by the chemical condensations of the phenol and formaldehyde. When, however, the phenol is first combined with proteids in accordance with my invention, and as above described, the character of the resulting mass is chemically changed and no condensation of phenol and formaldehyde molecules to form water takes place. Consequently, I entirely avoid the use of a catalyzer in producing the substance to be applied to tiles or other articles in carrying out my invention, and not only do I eliminate the use of a catalyzer but also dispense with the necessity of employing high temperatures or high pressures in the production of the substance I employ in carrying out my invention. I have found that normal atmospheric pressures and room temperatures are sufficient, thus enabling me to greatly reduce the cost of manufacture of the substance required to coat the tile, glass or other object in accordance with my invention, and at the same time enabling me to produce a very superior finished product.

The mass obtained as above described is not freely miscible with any of the common organic solvents, but presents certain peculiar phenomena with certain kinds of solvents, such as benzol, petroleum-benzin, and the like. For example, when the mass is mixed with a suitable quantity of such solvent, a free mixture takes place up to a certain critical limit, depending upon the nature of the solvent, and resulting in reducing the mass to a more liquid state. If, however, there is an excess of solvent, this critical limit is exceeded and the mass is turned into a jelly-like condition, and loses its adhesive property. If this jelly-like mass is permitted to evaporate, or is otherwise removed, until the critical limit is again restored, then the mass resumes its original liquid and adhesive condition. Consequently by employing a suitable solvent and a suitable quantity thereof I am enabled to control the proper degree of consistency of the liquid mass to permit it to be applied easily and readily as a coating or film to the surface of glass, cement blocks or other form of tile in the manufacture of lacquered products in accordance with my invention.

The mass produced as above described also mixes fairly well with nitro-benzol, anilin, carbontetrachlorid, chloroform, oleic acid, and the like, and hence these agents may serve to control the consistency of the liquid. The mass, however, does not mix with acetone, ether, alcohols, or water.

If the tile, glass, block or other body is to have a transparent coating applied to the surface thereof, the liquid produced as above described is applied thereto. If it is to have a transparent colored coating any suitable anilin dye may be mixed into the liquid; and if it is to have a non-transparent colored coating to be applied any suitable pigment may be kneaded into the mass before the organic solvent is added thereto.

The liquid prepared as above described is applied to the surface of the article to be coated therewith, in the production of the finished product, in any suitable or convenient manner, as by immersing the article in the liquid, or by means of a brush, or otherwise. Before the liquid is applied to the surface of the article, the article if porous, as in the case of brick, cement blocks or bodies, or the like, should be treated so as to present a smooth surface for the application of the liquid coating. This may be accomplished by applying a suitable preliminary filler to such surface as an undercoating. I have found that starch paste with some earthy material is efficient for this purpose. In the case of surfaces already smooth a preliminary application of filler thereto is unnecessary. This is true in the case of glass, chinaware, or the like.

In order to thoroughly impregnate the body with the coating liquid, it may sometimes be desirable to remove the air contained in the body, particularly in the case of bricks, cement tiles, blocks or paper board, or the like. This is effected by means of a vacuum chamber, or in any other convenient manner.

After the application of the proteidal liquid coating the body is dried. A highly polished surface may be secured by applying thereto a suitable polishing agent, such as iron oxid, powdered pummice stone, or the like.

The product presents a highly polished ornamental surface resembling a glazed article, and which is not affected by water, acid, alkali, heat, cold, weather variations, alcohol or other organic solvents.

The luster of the coated surface is controlled by the degree of polishing action applied thereto. Simply rubbing over the surface with a soft cloth, like flannel, will produce a desirable luster or polish.

Very beautiful ornamental effects are produced by applying differently colored coating liquids to different parts of such surface, or in any desired outline, ornamental design, picture, scene, or the like, thereby giving all the effects of ornamental stained glass, for example.

In using the word "body", or "tile", I desire to include not only brick, cement blocks, tile proper, glass, china, earthenware, or the like, but all bodies to which it may be desired to impart a lustrous surface.

My invention is of special value in the case of tile, brick, cement or composition blocks, wall surfacing or the like, particularly where it has been a common practice to burn the tile, brick, etc., in kilns. This is objectionable not only because of the expense involved but especially because of irregularities produced in the surface dimensions of the bodies or tiles and the warping of such bodies or tiles under the influence of the high heat to which they are subjected in the kilns. These are serious objections constantly encountered in the ordinary use of tiles and bodies and are entirely avoided by my invention where kiln burning of the bodies or tile is unnecessary. The proteidal liquid material is made at normal room temperatures and atmospheric pressures, and the bodies or tile are produced without baking and the liquid is applied to the surface thereof, thereby producing the products in absolute uniformity of surface dimension and without warping or other ill effects of baking. Irregularly shaped or molded bodies or surfaces may be given a lustrous coating with as great facility as regularly shaped bodies. Heretofore it has been impossible to give a glazed effect to bodies having irregular surfaces, shapes or sizes without great difficulty and expense.

Having now set forth the objects and nature of my invention, and the method of carrying the same into effect and operation, what I claim as new and useful, and of my own invention, and desire to secure by Letters Patent is,—

1. In the manufacture of lacquered products the process which consists in glutinizing and then condensing with an active methylene compound vegetable proteids to form a transparent liquid adhesive glue-like mass, then removing the air from a body or tile, and applying the liquid to such air removed surface.

2. In the manufacture of brick, cement or other bodies or tile the process which consists in forming such bodies or tile without heat, and then applying to the surface thereof vegetable proteids glutinized and then condensed with an active methylene compound into an adhesive glue-like liquid to form a glaze upon such surface.

3. The process of glazing the surface of bodies or tile which consists in applying thereto vegetable proteids glutinized and then condensed with an active methylene compound into an adhesive glue-like substance and drying the same.

4. The process of glazing the surface of bodies or tile which consists in applying thereto vegetable proteids glutinized and then condensed with an active methylene compound into a transparent adhesive glue-like liquid.

5. The process of glazing the surface of bodies or tile which consists in applying to different parts thereof vegetable proteids glutinized and then condensed with an active methylene compound into adhesive glue like vegetable proteidal liquids of relatively different colors.

6. As a new article of manufacture a body or tile having a surface coating formed of a condensation product of glutinized vegetable proteids with an active methylene compound.

7. As a new article of manufacture a body or tile having a surface coating formed of a transparent adhesive glue-like condensation product of glutinized vegetable proteids with an active methylene compound.

8. As a new article of manufacture a body or tile having a surface coating formed of condensation products of glutinized vegetable proteids with an active methylene compound of relatively different colors applied to different parts thereof.

9. As a new article of manufacture a body having a surface coating of glutinized and condensed vegetable proteidal substances which is impervious to water, acid, alkali, alcohol or other organic solvent, and to heat, cold or weather variations.

10. As a new article of manufacture a body having a transparent surface coating of glutinized and condensed vegetable proteidal substances, condensed with an active methylene compound thereby producing uniformity of surface of the body without subjecting the body to baking or burning in a kiln.

11. As a new article of manufacture a body having an unwarped surface glazed without baking with a condensation product of glutinized vegetable proteids with an active methylene compound.

In testimony whereof I have hereunto set my hand on this 25th day of January A. D., 1917.

SADAKICHI SATOW.